Jan. 23, 1962

L. B. KRAMER ETAL 3,018,357

WELDING APPARATUS AND METHOD

Filed April 11, 1955

Copper a   Low Carbon Nickel b   Zirconium c   Titanium d

Copper al   Low Carbon Nickel bl   Zirconium cl   Titanium dl

United States Patent Office 3,018,357
Patented Jan. 23, 1962

3,018,357
WELDING APPARATUS AND METHOD
Lloyd B. Kramer, Mount Lebanon, Alvin H. Kasberg, Jr., Bethel Borough, and John G. Landkrohn, North Huntington Township, Westmoreland County, Pa., assignors to Westinghouse Electric Corporation, East Pittsburgh, Pa., a corporation of Pennsylvania
Filed Apr. 11, 1955, Ser. No. 500,354
22 Claims. (Cl. 219—72)

This invention relates to electric welding and has particular relation to the welding of highly reactive materials.

In the production of modern apparatus, there is a heavy demand for the fabrication of parts from highly reactive materials such as zirconium and hafnium and their alloys with common materials such as tin, zinc or copper. This has led to attempts to weld these materials by prior art methods, but such attempts have been unsuccessful. It has been found that the joints in welded structures of hafnium and zirconium and their alloys do not have the purity or the strength of the parent metal and deteriorate rapidly when in use. The deterioration is enhanced by the conditions under which such structures are used. Thus, when the zirconium and hafnium structures are subjected to high temperatures in an oxygen and/or hydrogen containing medium, the welds deteriorate in a short time.

It is, accordingly, broadly an object of this invention to provide a method and apparatus for welding highly reactive materials such as zirconium and hafnium and their alloys.

Another object of this invention is to provide a method and apparatus for fabricating highly reactive materials such as zirconium and hafnium and their alloys with common metals such as tin.

An incidental object of this invention is to provide a novel method and apparatus for arc welding such materials as zirconium, hafnium, copper, nickel, molybdenum, palladium, uranium and their alloys with the more common metals.

Still another object of the invention is to provide such a method and apparatus for welding one of the materials of the above-listed group to another material of the group as, for example, zirconium to hafnium and also for welding one of the materials of the above-listed group to another material as, for example, palladium to stainless steel.

The invention arises from the discovery that the deficiency in prior art welds arises primarily from the presence of nitrogen in such welds and to a less critical extent from the presence of oxygen. The invention further arises from the realization that the presence of nitrogen or oxygen in the surrounding atmosphere is in its effect on a weld materially unlike what it is on a melted mass of the same material which is to be hot worked in one way or another. A molten mass of material is usually of relatively large volume, and any gas which it may absorb being of relatively small volume, the contamination of the mass by the gas is highly diluted. Further, the concentrations of gaseous impurities which are absorbed by the molten mass tend to be diffused in later hot working processes so that further dilution takes place. In the case of welds, the volume of gas is relatively large and the volume of molten metal relatively small so that a high concentration of gas is absorbed in the metal. In addition, the weld is not subjected to a hot working process and thus retains the high concentration of gas. It has then been concluded that the concentration of nitrogen or oxygen in any gas in which highly reactive metals or their alloys are melted must be maintained vanishingly low.

This conclusion has been borne out by experience. It has been found that to produce sound welds of zirconium of hafnium or their alloys, the nitrogen must be limited to less than .002% of the atmosphere in which the welding is produced. Experience has demonstrated that in situations in which the welds are made in an atmosphere in which the nitrogen concentration exceeds .002%, the fabricated parts become corroded in a short time when immersed in water at 600° F. and at a high pressure. It has also been demonstrated that the presence of oxygen in a weld of zirconium or hafnium or their alloys embrittles the weld, and since such metals as zirconium tend to absorb any trace of oxygen present, the oxygen must be maintained at the barest minimum in the welding atmosphere. The conclusion has been reached that a successful welding process with the highly reactive materials requires an atmosphere in which the nitrogen and oxygen are present to an amount of less than $1 \times 10^{-7}$, and structures of zirconium and hafnium and their alloys fabricated by welding in such an atmosphere have high purity and high strength and resist corrosion when operated in water at 600° F. and 700° F. and at a pressure of 2,000 pounds per square inch.

In accordance with our invention then, structures of zirconium and hafnium and their alloys are welded in a vacuum tight chamber. The welding may be of the resistance type, such as butt welding, or of the percussion type, but preferably, and in accordance with the specific aspects of the invention, is arc welding with a nonconsumable electrode such as tungsten in an atmosphere of an inert gas. The vacuum chamber includes facilities for mounting and moving the work and the welding electrodes so that a welding electrode may be positioned and moved relative to the work to carry out the welding operations properly. The movement of the work and of the electrodes is effected by motors disposed outside of the chamber having shafts which pass into the chamber through rotary vacuum seals. (Where the work to be performed is limited, provisions may be made for effecting the movement by hand by means of rubber gloves vacuum sealed into the chamber.) The vacuum chamber and the components in this chamber are made of materials which have a very low vapor pressure. The shafts are lubricated not by hydrocarbon lubricants but by a lubricant of a noble metal, molybdenum sulfide or other molybdenum compounds.

Preparatory to a welding operation, the work and the electrodes are mounted in the chamber and the chamber is evacuated to a pressure of the order of $10^{-6}$ millimeters of mercury. To assure the attainment of this low pressure, the chamber is usually fitted with strip heaters or similar heating apparatus so that it may be outgassed. After the chamber has been evacuated, it is filled with highly purified inert gas at a pressure of about one atmosphere. This gas should have a purity of 99.999%, and for this purpose, we preferably use helium having the above-specified purity. The principal remaining impurity in this gas is hydrogen, and it includes no measurable nitrogen or oxygen. The work is now welded.

In fabricating structures in modern apparatus, the welding time may be of the order of five hours. It is essential that the weld be completed during this time without opening the chamber, and for this reason any necessity of replacing electrodes must be avoided. This object is accomplished in accordance with the invention, first by providing an electrode having a relationship of tip to body diameter which we have found to yield long life, and secondly, by providing a plurality of electrodes so that if one electrode does become deteriorated, it may be replaced by another electrode. The electrodes are so arranged that the welding arc is at any time produced only between one of the electrodes and the work.

The novel features considered characteristic of the invention are disclosed generally above. The invention itself both as to its organization and its method of operation together with additional objects and advantages thereof, will be understood from the following description of a specific embodiment in which:

FIG. 5 is a diagram showing enlarged a portion of the welding electrode used in the practice of the invention;

FIG. 6 is a graph showing the relationship between the body and tip diameter of a welding electrode in accordance with the invention;

Figure 8:
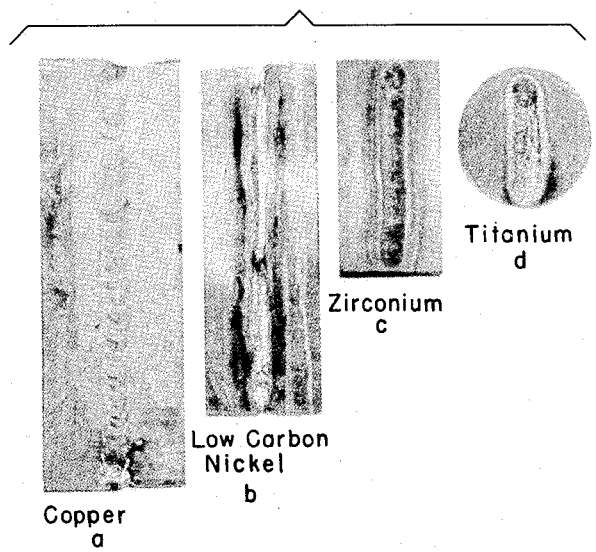
Figure 9:
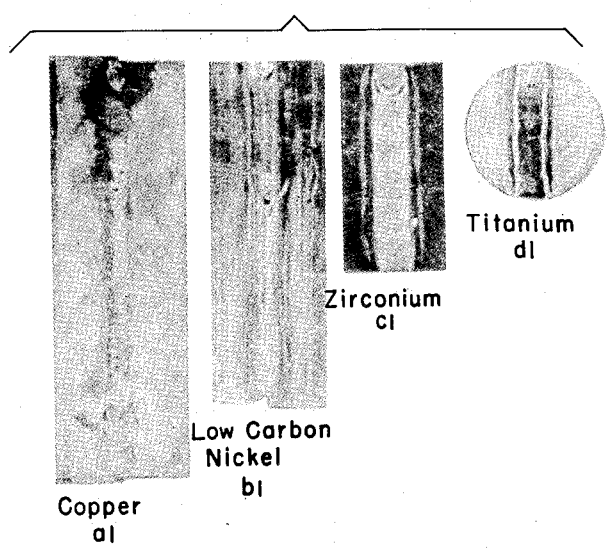

FIG. 8 presents a series of photographs of welds made in accordance with the invention; and FIG. 9 presents a series of photographs of welds made in accordance with the teachings of the prior art.

The apparatus shown in FIGS. 1 to 4 includes a chamber C which may be composed of a sheet metal of a material having a very low vapor pressure. Preferably, this material is stainless steel, although a material such as aluminum is also suitable. The chamber C consists of a hollow central circularly cylindrical shell 21 having flanges 23 and 25 at its ends and of end bells 27 and 29 having flanges 31 and 33. The chamber is formed by bolting the flanges 23 and 31 and 25 and 33 of the bells 27 and 29 and the central cylindrical portion 21 together. The usual high vacuum packing materials are included in the joints 23—31 and 25—33 to assure that the joints are vacuum tight. Briefly, the opening in the flanges through which the bolts 34 pass are sealed off by a circumferential groove 36 in which an O-ring 38 is compressed so as to fill the groove precisely. The end bells 27 and 29 are provided with pairs of coextensive openings 41 and 43 respectively (two in each) through which bearings 45 and 47 and associated shafts 49 and 51 extend. The bearings 45 and 47 are sealed vacuum tight through the bells 27 and 29 and the shaft passes through a rotary vacuum seal.

Figure 1:
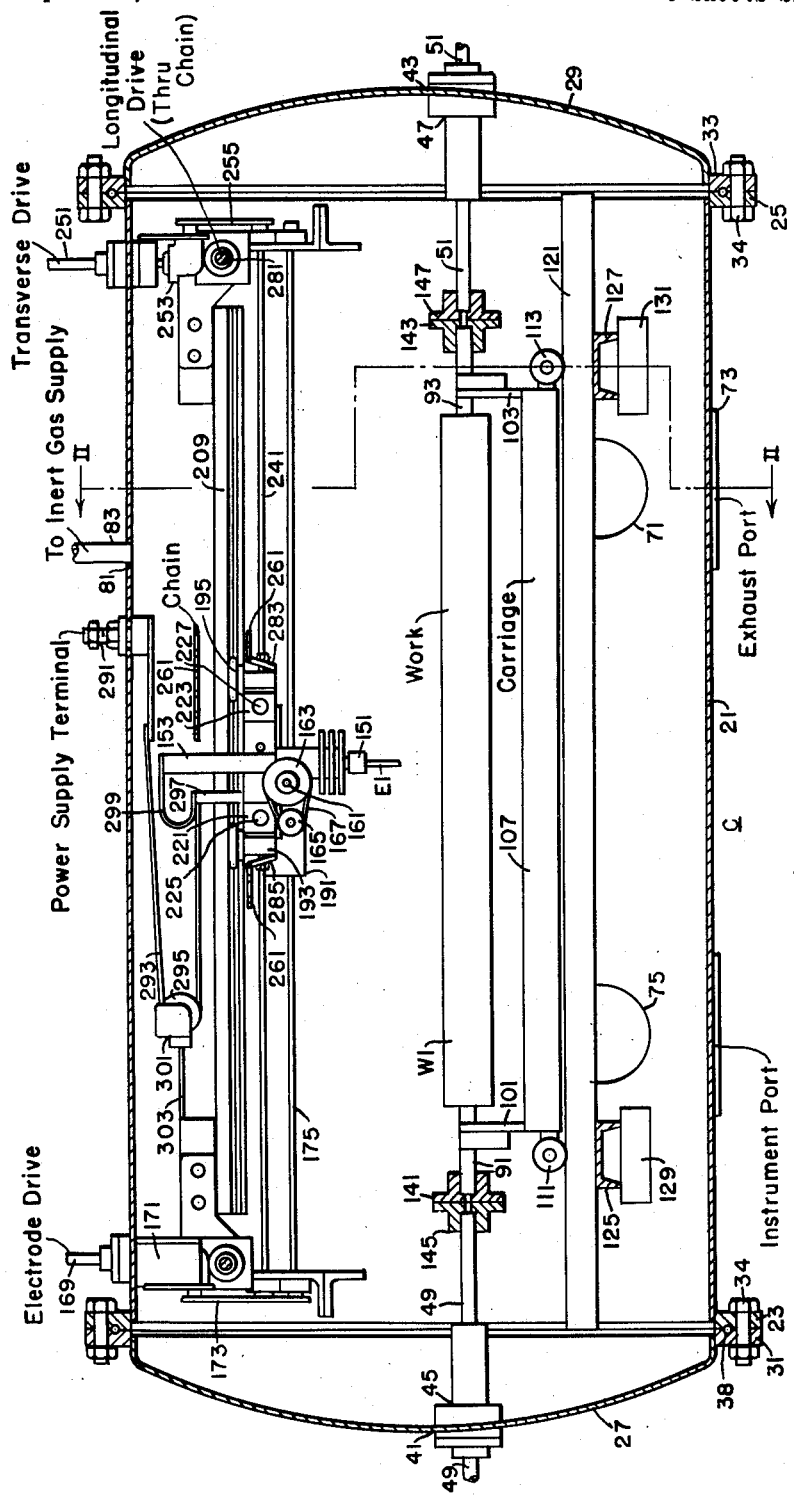
FIGURE 1 is a view in longitudinal section of welding apparatus in accordance with the invention.
Figure 2:
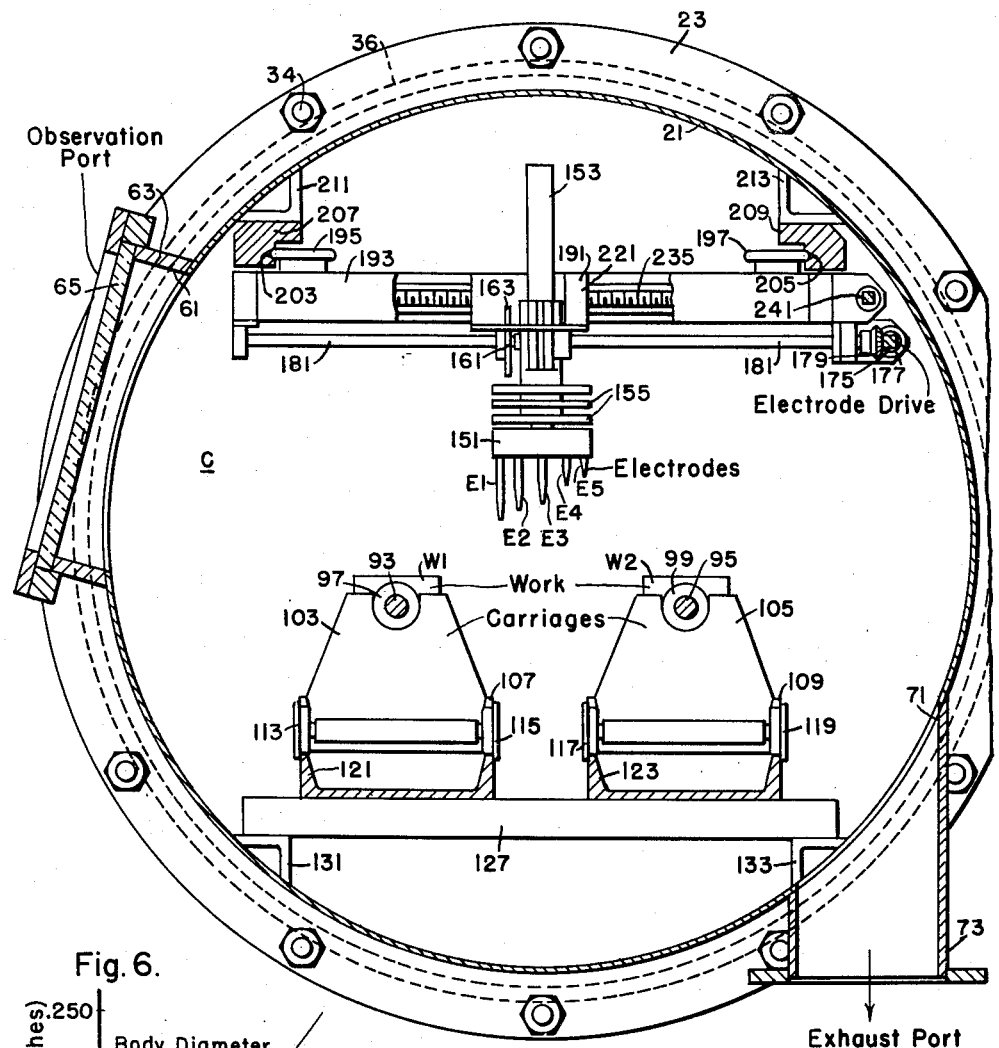
FIG. 2 is a view in section taken along line II—II of FIG. 1.
Figure 3:
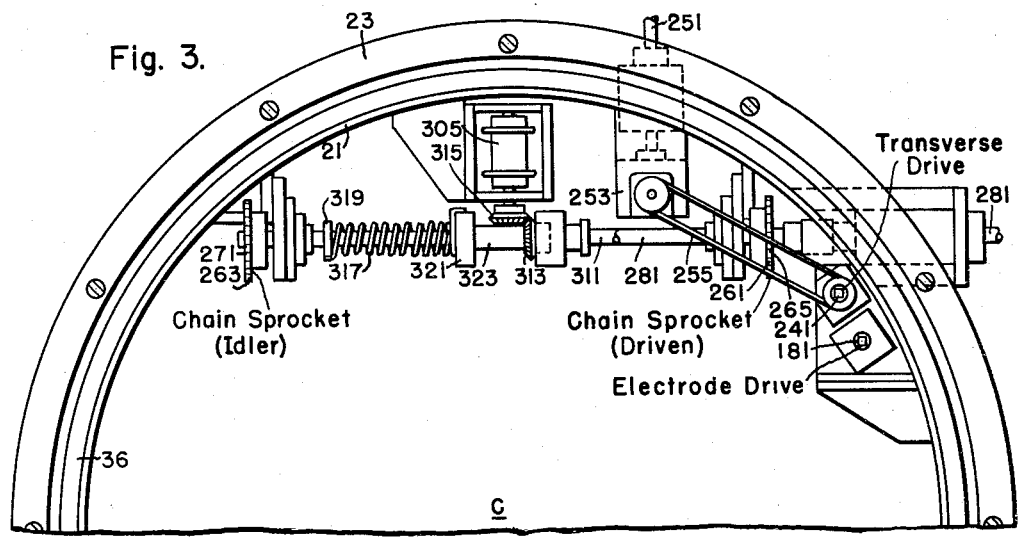
FIG. 3 is an end view with the end bell removed of a portion of the apparatus shown in FIGS. 1 and 2.
Figure 4:
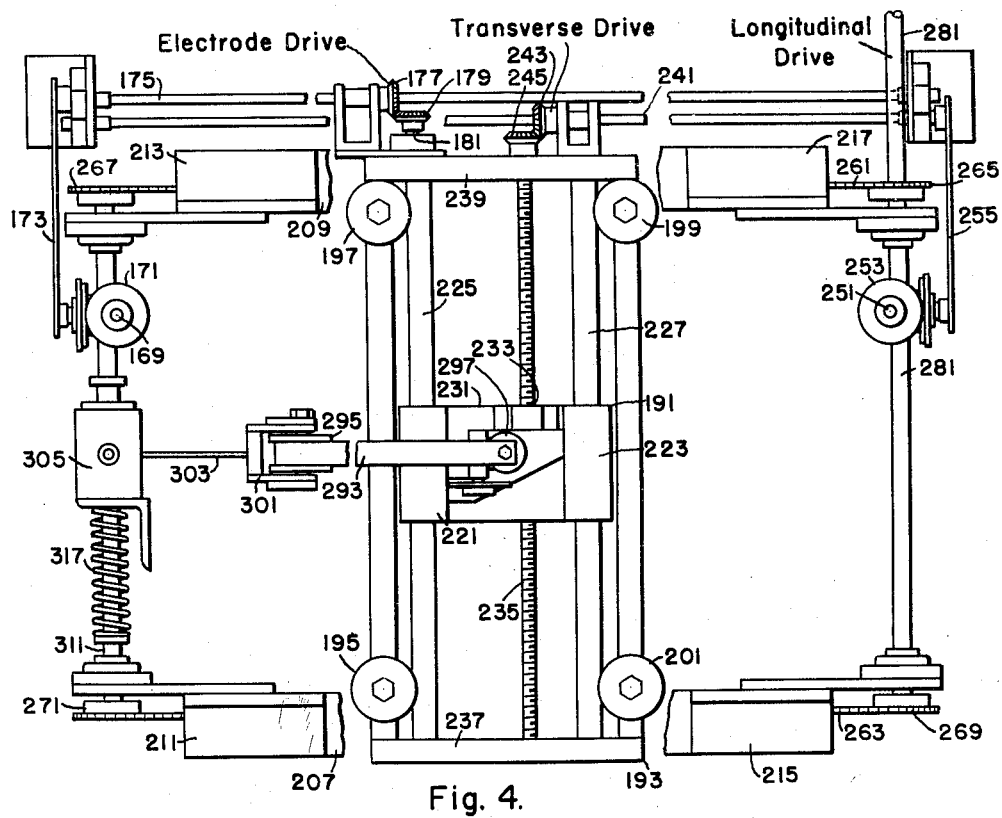
FIG. 4 is a top view with the wall of the chamber removed.
Figure 7:
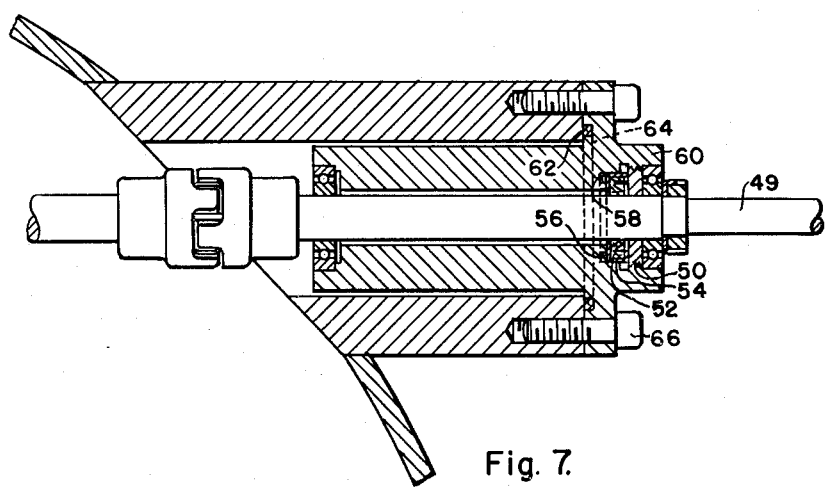
FIG. 7 is a view in section showing a rotary seal used in the practice of the invention.

A seal unit of this type is shown in FIG. 7. This unit includes principally a seal 50 which includes a ring 52 of a packing material such as neoprene compressed against the shaft 49 by a hollow collar 54, an O-ring 56 of packing material compressed in a groove 58 in the bearing housing 60 by the collar 54, and a second O-ring 62 sealed in a groove 64 in the bearing housing for sealing off the bolts 66 which hold the bearing housing.

The cylindrical shell 21 is provided along one side with a plurality of openings 61 into which cylindrical flanged tubes 63 are sealed gas tight. The tubes 63 are closed by transparent windows 65. The openings 61 are so disposed that the welding operation may be observed through the windows 65. The shell 21 is also provided with an additional opening or port 71 to which another flanged tubular projection 73 is sealed gas tight. This projection is adapted to be coupled to a vacuum system. In the preferred practice of this invention, this system includes a mechanical pump in series with a diffusion pump. The tube 73 and the evacuating system are of such dimensions and pumping capacity as to be capable of evacuating the chamber to the extent desired; that is, to a vacuum of the order of $10^{-6}$ millimeters of mercury. In an additional sealed port 75, meters and instruments and instrument cables may be inserted. The cylindrical shell 21 is also provided with another opening 81 to which a tubular projection 83 is sealed. This projection is adapted to be connected to an inert gas tank so that the chamber may be filled with inert gas at the proper pressure.

A plurality of units of work W1 and W2 may be welded in the chamber. Each unit W1 and W2 is suspended from a plurality of shafts 91, 93 and 95 which are rotatable in bearings 97 and 99 supported in trunnions 101, 103 and 105 extending from carriages 107 and 109 respectively. The carriages 107 and 109 are each mounted on wheels 111, 113, 115, 117, 119 which engage tracks 121 and 123 respectively. The tracks 121 and 123 are supported on channels 125 and 127 mounted on angles 129, 131 and 133 welded to the shell 21 at positions which are properly displaced to provide a firm support for the work carriage and the work.

The shafts 91, 93, 95 which extend from the work W1 and W2 each carry at each end a coupling 141, 143 which is engaged by a cooperative coupling 145 and 147 connected to the shafts 49 and 51 extending through the bells 27 and 29. The work W1 and W2 may be properly positioned for welding by setting the carriages 107 and 109 in the desired positions on the tracks 121 and 123. The work W1 and W2 may be rotated by a motor (not shown) connected to the coupled shafts 49 and 51 at one end so that the welding may be carried out transversely as well as longitudinally.

The apparatus in accordance with the invention includes a supporting block 151 from which a plurality of electrodes E1, E2, E3, E4, E5 are suspended. The electrodes E1 through E5 are preferably of tungsten and are held in the block by set screws (not shown), projecting through the block 151 to progressively decreasing extent. The electrode supporting block 151 is suspended from a rod 153 which has cooling fins 155 adjacent the block 151 and carries a rack (not shown). The rack engages a pinion (not shown) which may be rotated to move the rack and the electrodes E1 through E5 upwardly and downwardly.

The pinion is mounted on a shaft 161 in common with a pulley wheel 163 which is driven through a belt 167 at a reduced rotational speed from another pulley wheel 165. The latter is driven from a motor driven shaft 169 which passes through a rotary vacuum seal and is coupled through a reduction gearing 171, a belt 173, a shaft 175 of square cross section, bevel gears 177 and 179 to a shaft 181 of square cross section. This shaft 181 is coupled to the pulley wheel 165 through bevel gears (not shown). The driving gear 177 is slidable on the square shaft 175 and the driving gear (not shown) on the shaft 181 is also slidable on the latter. Thus, the shaft 181 and the parts on it and driven by it may be moved to different positions along shaft 175, and the pulley wheels 163, 165 and the parts driven by them may be moved to different positions along shaft 181.

The pulley wheels 163 and 165, their belt 167, the shaft 161, the pinion (not shown) on shaft 161 and the bevel gear (not shown) through which the wheel 165 is driven are mounted on a bracket 191 suspended from a carriage 193 of rectangular frame shape. The carriage 193 is provided with wheels 195, 197, 199, 201 near its ends which ride in tracks 203 and 205 integral with brackets 207, 209 secured to angles 211, 213, 215, 217 extending along the length of the shell 21. The bracket 191 has sleeves 221 and 223 which slidably engage cross rods 225 and 227 on the carriage 193. The bracket 191 also has a cross piece 231 which connects the sleeves 221 and 223. This piece 231 has a threaded opening 233 which engages a threaded shaft 235 journaled in the cross arms 237 and 239 of the carriage 193. The bracket 191 may be moved along the rods 225 and 227 by rotation of the threaded shaft 235 driven from a square shaft 241 through beveled gears 243 and 245. The shaft 241 is driven from a motor driven shaft 251 which passes through a rotary vacuum seal and drives the shaft 241 through reduction gearing 253 and a belt 255. The bracket 191 and the parts attached to it including the electrodes E1 through E5 are thus moved transversely. The driving beveled gear 243 is movable along the shaft 241 and thus permits longitudinal movement of the gear 245 and the threaded shaft 235 with the carriage 193.

The electrode carriage 193 may be moved on the tracks 211 and 213 longitudinally by a pair of chains 261 and 263, each of which passes over and engages sprocket wheels 265 and 267 and 269 and 271. One of the sprocket wheels 265 and 269 associated with each chain 261 and 263 is driven from a motor driven shaft 281 which passes through a rotary vacuum seal. Each chain 261 and 263 is connected at its ends to strips 283 and 285 (FIG. 1) extending from the sides of the rectangular frame carriage 193. These strips are bolted to the frame 193 to tauten the chain.

In supplying power for welding the work W1 and W2 and one pole of the supply (not shown) are grounded to the chamber. The other or hot pole of the supply is connected to a terminal 291 extending centrally through a vacuum seal in the shell 21. This terminal is secured to a flexible band conductor 293 which passes over a pulley wheel 295 and is conductively connected to a terminal rod 297 on the bracket 191. This rod 297 is connected through a flexible conductor 299 to the rod 153 supporting the electrodes E1 through E5. The pulley wheel 295 is mounted on a bracket 301 which is joined by a cable 303 to the periphery of another pulley wheel 305.

As the electrode carriage 193 is moved longitudinally by movement of the chains 261 and 263, the cable pulley wheel 305 is rotated so as to permit the flexible band 293 to adjust itself to the position of the electrode carriage 193 along the length of the chamber C. This rotation of the cable pulley 305 is effected from a shaft 311, driven by the chains 261 and 263 through a pair of bevel gears 313 and 315. The driving gear 313 is driven from the shaft 311 through a coil spring 317 secured at one end to a collar 319 fixed to the shaft 311 and at the other end to a collar 321 on a sleeve 323 rotatable relative to the shaft 311. This sleeve 323 carries the driving gear 313. When the chains 261 and 263 are moved to move the carriage 193 longitudinally in either direction, the spring 317 is tensioned, and once tensioned, tends to rotate the driving gear 313 which in turn causes the pulley wheel 305 to rotate and to pull in or let out the cable 303 and thus permit the pulley wheel 295 to move in one direction or the other to shorten or lengthen the band 293. The effect of the spring 317 is to tauten the band 293 in all positions of the carriage 193. Since the cable 303 and the band 293 are flexible, they permit movement transversely of the bracket 191. The flexible conductor 299 permits upward and downward movement of the electrodes E1 through E5.

The electrodes E1 through E5 used in the preferred practice of our invention is of the type having a taper. The taper is such that the body diameter is at least twice the tip diameter. An electrode E of our preferred type is shown in FIG. 5, and the relationship between the body diameter and the tip diameter for electrodes capable of carrying currents of different magnitude is shown by the two graphs in FIG. 6.

When an electrode of the type just described is in use, it operates with a high current density at the tip and a high thermal gradient behind the tip. This gradient is such that fusion and deformation of the electrode is avoided. In welding with this electrode, the arc burns with an orange colored flame and is steady, so that there is no tendency of the weld metal, particularly in the case of zirconium, to volatilize. We have found that such volatilization tends to deposit metal on the electrode tip and cause the electrode tip to grow so that the electrode soon becomes useless. Volatilized metal also collects as a fine powder in the chamber. Such a powder constitutes a serious fire hazard.

At least five drive shafts project through the chamber C; these are the shafts 49 and 51 and the similar pair for the work W2, and the shafts 169, 251 and 281. Each of these shafts is independently driven and for their selective operation a control rack (not shown) is provided. This control rack includes three position reversing switches and variable speed controls for the longitudinal and transverse drive motors. There are pushbuttons for manual control of the arc length and in addition facilities for automatic control. There are also switches for turning the welding current on and off. The usual meters are included for monitoring the arc length.

In the use of the apparatus, the work W1 and W2 is mounted on the work carriage 107 and the carriage is set so that the work is properly positioned for welding. The electrodes E1 through E5 are also mounted in the electrode holder 151. The exhaust tube 73 is then connected to the evacuating system, the inert gas tube 83 to an inert gas cylinder. The evacuating system is then turned on with the valve in the inert gas system closed, and the chamber C is evacuated to a low pressure. We have found a pressure of $3 \times 10^{-5}$ millimeters of mercury to be suitable, although a lower pressure is sometimes preferred. To facilitate the exhausting of the chamber, the chamber C is heated by heating strips provided around it. After the chamber has been exhausted, the inert gas which is preferably helium, having a purity of the order of 99.999%, is supplied to the chamber at a pressure of about one atmosphere. When the helium is at the proper pressure, the electrode carriage 193 is set so that the longest electrode E1 is in a position to produce welds, an arc is struck between the longest electrode and the work, and the welding proceeds. During the welding operation, the evacuating system is operated continuously but a valve between the evacuating system and the chamber C is maintained closed by the difference in pressure and the helium is not pumped out by the operation of the evacuating system.

We have found that with a tapered electrode as described above, a uniform arc flame is maintained during more than 3,000 inches of welding. This should prove adequate in most situations, but for the eventuality that the welding electrode becomes deteriorated before the welding in the chamber is completed or becomes broken, additional electrodes are provided. These electrodes (E2 through E5) project from the electrode holder 151 progressively decreasing distances so that the longest electrode E1 in any situation is the first one to be used. When this electrode becomes incapacitated, it may be broken by driving the electrode against the work while the power is disconnected, or by driving the electrode against the wall of the chamber C or against any other obstruction. The next longest electrode (E2) may then serve to continue the welding operation.

With the apparatus as disclosed in the drawing, a large number of units of zirconium and hafnium and their alloys, have been fabricated successfully. In addition, zirconium has been welded to hafnium. Further, parts made of copper, titanium, nickel alloys, molybdenum, uranium alloys have been welded and palladium has been welded to stainless steel, and titanium to hafnium and zirconium. All of the welds thus produced were of the highest quality, far superior to welds produced in the same structures in a shield of inert gas operating in open air.

FIG. 8 shows the difference in quality between welds made in accordance with the invention (labeled by letters a, b, c, d) and welds made carefully in accordance with the teachings of the prior art (labeled a1, b1, c1, d1). a and a1 are copper joints. It is seen that the weld a1 has several blow holes, while weld a is a solid joint free of any holes. b and b1 are joints of low carbon nickel. Again, weld b1 has blow holes and b is free of them. c and c1 are zirconium joints. In this case weld c1 is covered with a coating of nitrides and oxides while weld c presents a metal surface. d and d1 are titanium joints.

Again weld $d1$ is coated with oxides and nitrides while $d$ presents a metallic surface.

Among the important features of our invention are a vacuum tight chamber which is provided with rotary vacuum seals, electric power and control fittings, the usual water fittings and inspection ports; a three dimensional mechanism that allows positioning and relative motion between the electrode and work and is entirely contained within the vacuum chamber; an electrode that is shaped so as to yield the desired arc flame characteristics over long periods of operation; an evacuation system that allows the attainment of a high vacuum; the use of a high purity inert gas within the chamber for shielding purposes; the use of material within the chamber which has a low vapor pressure so that the desired high vacuum may be produced.

While certain specific embodiments of the invention have been shown and described, many modifications thereof are possible. The invention, therefore, is not to be restricted except insofar as is necessitated by the spirit of the prior art.

We claim as our invention:

1. The method of arc welding an object of a material of the class consisting of zirconium and hafnium and their alloys, copper, titanium, nickel alloys, uranium alloys, molybdenum, palladium and stainless steel with a nonconsumable electrode in a gas tight chamber which comprises mounting said electrode and object in said chamber in a position such that a welding arc may be produced between said electrode and object, evacuating said chamber, filling said chamber with an inert gas at a substantial pressure and producing an arc between said electrode and object to weld said object, the said method being characterized by the fact that said chamber was previously evacuated to a pressure of the order of $10^{-6}$ millimeters of mercury and by the further fact that said inert gas has a purity of the order of 99.999%.

2. Apparatus for welding an object of a highly reactive material of the class consisting of zirconium and hafnium and their alloys, copper, titanium, molybdenum, uranium alloys, palladium and stainless steel comprising a vacuum tight chamber, a welding electrode, means for mounting said object within said chamber, means for mounting said electrode within said chamber, and means for moving said electrode mounting means to position said electrode relative to said object for welding, the said apparatus being characterized by the fact that the chamber and said moving means is composed of a material having a low vapor pressure.

3. The method of welding an object of material of the class consisting of zirconium and hafnium and their alloys, copper, molybdenum, uranium alloys, palladium and stainless steel which is characterized by the novelty of carrying out the welding in a shielding atmosphere which includes not more than $1 \times 10^{-7}$ parts of nitrogen and oxygen.

4. The method of welding an object of material of the class consisting of zirconium and hafnium and their alloys, copper, molybdenum, uranium alloys, palladium and stainless steel which is characterized by the novelty of carrying out the welding in a shielding atmosphere which includes less than .002 percent nitrogen and only traces of oxygen.

5. The method of arc welding an object of a material of the class consisting of zirconium and hafnium and their alloys, copper, titanium, nickel alloys, uranium alloys, molybdenum, palladium and stainless steel with a nonconsumable electrode in a gas tight chamber which comprises mounting said electrode and object in said chamber in a position such that a welding arc may be produced between said electrode and object, evacuating said chamber, filling said chamber with helium at a substantial pressure and producing an arc between said electrode and object to weld said object, the said method being characterized by the fact that said chamber was previously evacuated to a pressure of the order of $10^{-6}$ millimeters of mercury and by further fact that said helium has a purity of the order of 99.999%.

6. Apparatus for welding an object of a highly reactive material of the class consisting of zirconium and hafnium and their alloys, copper, titanium, molybdenum, nickel alloys, uranium alloys, palladium and stainless steel comprising a vacuum tight chamber, a welding electrode, means for mounting said object within said chamber, and means for moving said electrode mounting means to position said electrode relative to said object for welding, the said apparatus being characterized by the fact that the chamber and said moving means is composed substantially only of one or more materials of the class consisting of stainless steel and aluminum.

7. Apparatus for welding an object of a highly reactive material of the class consisting of zirconium and hafnium and their alloys, copper, titanium, molybdenum, nickel alloys, uranium alloys, palladium and stainless steel comprising an elongated vacuum tight chamber, a welding electrode, means for mounting said object within said chamber, said object mounting means being disposed to position said object along the length of said chamber, means for mounting said electrode within said chamber, and means for moving said electrode mounting means to position said electrode relative to said object for welding, said moving means including means for moving said electrode longitudinally of said object, means for moving said electrode transversely of said object and means for moving said electrode towards and away from said object, the said apparatus being characterized by the fact that the chamber and said moving means is composed of a material having a low vapor pressure.

8. Apparatus for welding an object of a highly reactive material of the class consisting of zirconium and hafnium and their alloys, copper, titanium, molybdenum, nickel alloys, uranium alloys, palladium and stainless steel comprising an elongated vacuum tight chamber, a plurality of welding electrodes, means for mounting said object within said chamber, said object mounting means being disposed to position said object along the length of said chamber, means for mounting said electrodes within said chamber, said electrode mounting means including means for mounting said electrodes so that the welding may be performed with any electrode of said plurality at the will of the operator without setting up the apparatus anew for each electrode, and means for moving said electrode mounting means to position said electrodes relative to said object for welding, said moving means including means for receiving said electrodes longitudinally of said object, means for moving said electrodes transversely of said object and means for moving said electrodes towards and away from said object, the said apparatus being characterized by the fact that the chamber and said moving means is composed of a material having a low vapor pressure.

9. Apparatus for welding an object of a highly reactive material of the class consisting of zirconium and hafnium and their alloys, copper, titanium, molybdenum, nickel alloys, uranium alloys, palladium and stainless steel comprising an elongated vacuum tight chamber, a plurality of welding electrodes, means for mounting said object within said chamber, said object mounting means being disposed to position said object along the length of said chamber, means for mounting said electrodes within said chamber, said electrode mounting means including means for mounting said electrodes with each electrode projecting from said mounting means towards said object a different distance so that the welding may be performed at any time by the electrode having the greatest projecting distance towards the work whereby on the disabling of any electrode the projecting distance of this disabled electrode may be reduced and the welding may proceed without resetting the apparatus with the electrode having the next projecting distance, and means for moving said electrode mounting means to position said electrodes relative to said object for welding, said moving means including means for moving said electrodes longitudinally of said object, means for moving said electrodes transversely of said object and means for moving said electrodes towards and away from said object.

10. Apparatus for welding an object of a highly reactive material of the class consisting of zirconium and hafnium and their alloys, copper, titanium, molybdenum, uranium alloys, palladium and stainless steel comprising a vacuum tight chamber, a welding electrode, means for mounting said object within said chamber, means for mounting said electrode within said chamber, and means for moving said electrode mounting means and said work mounting means one relative to the other to position said electrode relative to said object for welding, the said apparatus being characterized by the fact that the chamber and said moving means is composed of a material having a low vapor pressure.

11. Apparatus for welding an object of a highly reactive material of the class consisting of zirconium and hafnium and their alloys, copper, titanium, molybdenum, nickel alloys, uranium alloys, palladium and stainless steel comprising an elongated vacuum tight chamber, a plurality of welding electrodes, means for mounting said object within said chamber, said object mounting means being disposed to position said object along the length of said chamber, means for mounting said electrodes within said chamber, said electrode mounting means including means for mounting said electrodes so that the welding may be performed with any electrode of said plurality at the will of the operator without setting up the apparatus anew for each electrode, and means for moving said electrode mounting means to position said electrodes relative to said object for welding.

12. Apparatus for welding an object of a highly reactive material of the class consisting of zirconium and hafnium and their alloys, copper, titanium, molybdenum, nickel alloys, uranium alloys, palladium and stainless steel comprising an elongated vacuum tight chamber, a plurality of welding electrodes, means for mounting said object within said chamber, said object mounting means being disposed to position said object along the length of said chamber, means for mounting said electrodes within said chamber, said electrode mounting means including means for mounting said electrodes with each electrode projecting from said mounting means towards said object a different distance so that the welding may be performed at any time by the electrode having the greatest projecting distance towards the work whereby on the disabling of any electrode the projecting distance of this disabled electrode may be reduced and the welding may proceed without resetting the apparatus with the electrode having the next projecting distance, and means for moving said electrode mounting means to position said electrodes relative to said object for welding.

13. The method of fabricating by arc welding an object of material of the class consisting of zirconium and hafnium and their alloys, copper, molybdenum, uranium alloys, palladium and stainless steel, the welds joining the parts of said object being corrosion resistant when subjected to water at 600° F. and at high pressures, the said method being characterized by the novelty of carrying out the welding in a shielding atmosphere which includes the equivalent of not more than $1 \times 10^{-7}$ parts of nitrogen and oxygen.

14. The method of fabricating by arc welding an object of material of the class consisting of zirconium and hafnium and their alloys, copper, molybdenum, uranium alloys, palladium and stainless steel, the welds joining the parts of said object being corrosion resistant when subjected to water at 600° F. and at high pressures, the said method being characterized by the novelty of carrying out the welding in a shielding atmosphere which includes the equivalent of less than .002 percent nitrogen and only traces of oxygen.

15. The method of arc welding an object of a material of the class consisting of zirconium and hafnium and their alloys, copper, titanium, nickel alloys, uranium alloys, molybdenum, palladium and stainless steel with a nonconsumable electrode in a gas-tight chamber which comprises mounting said electrode and object in said chamber in a position such that a welding arc may be produced between said electrode and object, evacuating said chamber, filling said chamber with an inert gas at a substantial pressure and producing an arc between said electrode and object to weld said object, the said method being characterized by this that said chamber was previously evacuated to a low pressure and further characterized by this that said inert gas has a high purity, said pressure and purity being such as effectively to prevent the access of nitrogen and oxygen to the weld in such quantities as would result in imperfections in the weld which would lead to deterioration of the welded joint in a corrosive medium.

16. The method of arc welding an object of a material of the class consisting of zirconium and hafnium and their alloys, with a nonconsumable electrode in a gas-tight chamber which comprises mounting said electrode and object in said chamber in a position such that a welding arc may be produced between said electrode and object, evacuating said chamber, filling said chamber with an inert gas at a substantial pressure and producing an arc between said electrode and object to weld said object, the said method being characterized by this that said chamber was previously evacuated to a low pressure and further characterized by this that said inert gas has a high purity, said pressure and purity being such as effectively to prevent the access of nitrogen and oxygen to the weld in such quantities as would result in imperfections in the weld which would lead to deterioration of the welded joint in water at temperatures as high as 600 or 700° F. and at pressures as high as 2000 pounds per square inch.

17. A method of welding an object of a material of the class consisting of zirconium and hafnium and their alloys to produce welded structures having welds of high purity and of high strength and which shall be capable of resisting corrosion when subjected to water at temperatures as high as 600 or 700° F. and pressures as high as 2000 pounds per square inch characterized in that the welding is carried out in a shielding atmosphere which includes less than 0.002 percent of nitrogen and only traces of oxygen.

18. A method of welding an object of a material of the class consisting of zirconium and hafnium and their alloys to produce welded structures having welds of high purity and of high strength and which shall be capable of resisting corrosion when subjected to water at temperatures as high at 600 or 700° F. and pressures as high as 2000 pounds per square inch characterized in that the welding is carried out in a shielding atmosphere including not more than $1 \times 10^{-7}$ parts of nitrogen and oxygen.

19. A method of welding an object of a material of the class consisting of zirconium and hafnium and their alloys to produce welded structures having welds of high purity and of high strength and which shall be capable of resisting corrosion when subjected to water at temperatures as high as 600 or 700° F. and pressures as high as 2000 pounds per square inch, comprising mounting a nonconsumable arc welding electrode and the object in a gas-tight chamber in such a position that a welding arc may be produced between said electrode and object, evacuating said chamber, filling said chamber with an inert gas at a substantial pressure and producing an arc between said electrode and object to weld said object, the said method being characterized in that said chamber was previously evacuated to a pressure of the order of $10^{-6}$ millimeters of mercury and that said inert gas has a purity of the order of 99.999%, the principal impurity in said gas being hydrogen, said gas including no measurable quantities of nitrogen or oxygen.

20. A method of welding an object of a material of the class consisting of zirconium and hafnium and their alloys to produce welded structures having welds of high purity and of high strength and which shall be capable of resisting corrosion when subjected to water at temperatures as high as 600 or 700° F. and pressure as high as 2000 pounds, comprising mounting a nonconsumable arc welding electrode and the object in a gas-tight chamber in such a position that a welding arc may be produced between said electrode and object, evacuating said chamber, filling said chamber with an inert gas at a substantial pressure and producing an arc between said electrode and object to weld said object, the said method being characterized in that said chamber was previously evacuated to a pressure of the order of $10^{-6}$ millimeters of mercury and that said inert gas has a purity of the order of 99.999%, the principal impurity in said gas being hydrogen, said gas including no measurable quantities of nitrogen or oxygen, said inert gas being helium and the pressure at which said helium fills said chamber is of the order of one atmosphere.

21. Arc-welding apparatus for welding an object, comprising a vacuum-tight chamber, a non-consumable welding electrode, means for mounting said object within said chamber, means for mounting said electrode within said chamber, a connection for supplying power penetrating said chamber through a vacuum seal and connected to said electrode within said chamber, and means for moving said electrode mounting means to position said electrode relative to said object for welding, the moving means penetrating said chamber through vacuum seals, the said apparatus being characterized in that said connection is connected to said electrode through a conductor which is adjustable in length to accommodate the movement of the electrode.

22. Arc-welding apparatus for welding an object comprising a vacuum-tight chamber, a nonconsumable welding electrode, means for mounting said object within said chamber, a connection for supplying power penetrating said chamber through a vacuum seal and connected to said electrode within said chamber, and means for moving said electrode mounting means to position said electrode relative to said object for welding, the moving means penetrating said chamber through vacuum seals, the said apparatus being characterized in that said connection is connected to said electrode through a flexible conductor which is adjustable in length to accommodate the movement of the electrode, said electrode-positioning means including means connected to said conductor for maintaining said conductor taut in any position of said electrode.

References Cited in the file of this patent

UNITED STATES PATENTS

| Number | Name | Date |
|---|---|---|
| 409,150 | Coffin | Aug. 13, 1889 |
| 1,746,081 | Hobart | Feb. 4, 1930 |
| 1,827,245 | Lincoln et al. | Oct. 13, 1931 |
| 1,831,343 | Caldwell | Nov. 10, 1931 |
| 2,009,903 | Pfanstiehl | July 30, 1935 |
| 2,053,417 | Brace | Sept. 8, 1936 |
| 2,194,909 | Moss et al. | Mar. 26, 1940 |
| 2,290,338 | Koehring | July 21, 1942 |
| 2,404,157 | Ahalt | July 16, 1946 |
| 2,405,828 | Huguley | Aug. 13, 1946 |
| 2,431,334 | Lambert | Nov. 25, 1947 |
| 2,459,812 | Griffiths | Jan. 15, 1949 |
| 2,468,647 | Watter | Apr. 26, 1949 |
| 2,481,042 | Tomasek et al. | Sept. 6, 1949 |
| 2,654,822 | Agule | Oct. 6, 1953 |
| 2,687,466 | Mott | Aug. 24, 1954 |
| 2,727,972 | Williams et al. | Dec. 20, 1955 |
| 2,853,408 | Stengel | Sept. 23, 1958 |
| 2,856,509 | Stanchus | Oct. 14, 1958 |

FOREIGN PATENTS

| 439,743 | Germany | Jan. 19, 1927 |
|---|---|---|

OTHER REFERENCES

Arc Welding in Controlled Atmospheres, Doan and Smith, Weld. Res. Supp., March 1940, pp. 1105–1165.

Facts About Zirconium, copyright May 1954, by Carborundum Metal Co. Inc. of Akron, N.Y.

Zirconium and Zirconium Alloys (Textbook), published 1953, American Society for Metals.

Journal de la Sondoure, May 1953, pp. 301.